(12) United States Patent
Ogawa et al.

(10) Patent No.: US 10,344,854 B2
(45) Date of Patent: Jul. 9, 2019

(54) ENGINE ROOM TEMPERATURE RISE RESTRICTING APPARATUS

(71) Applicant: Honda Motor Co., Ltd., Tokyo (JP)

(72) Inventors: Seiichi Ogawa, Wako (JP); Masao Takiguchi, Wako (JP); Yohei Okagawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 17 days.

(21) Appl. No.: 15/831,313

(22) Filed: Dec. 4, 2017

(65) Prior Publication Data
US 2018/0163863 A1 Jun. 14, 2018

(30) Foreign Application Priority Data

Dec. 9, 2016 (JP) ................. 2016-238933

(51) Int. Cl.
F16H 61/662 (2006.01)
B60K 11/08 (2006.01)
(Continued)

(52) U.S. Cl.
CPC ........ *F16H 61/66259* (2013.01); *B60K 11/02* (2013.01); *B60K 11/04* (2013.01); *B60K 11/08* (2013.01); *B60K 11/085* (2013.01); *B60W 10/00* (2013.01); *B60W 10/04* (2013.01); *B60W 10/06* (2013.01); *B60W 10/101* (2013.01); *B60W 10/107* (2013.01); *B60W 10/30* (2013.01); *F02D 41/22* (2013.01);
(Continued)

(58) Field of Classification Search
CPC ......... B60K 11/02; B60K 11/06; B60K 11/08; B60K 11/085; F16H 61/66259; F16H 2063/504; B60W 10/06; B60W 10/101; B60W 10/107; B60W 10/30
See application file for complete search history.

(56) References Cited

U.S. PATENT DOCUMENTS 4,663,990 A * 5/1987 Itoh ................... F16H 61/66259
477/43
8,469,000 B2 * 6/2013 Ouwenga ................ F02B 39/04
123/337
(Continued)

FOREIGN PATENT DOCUMENTS

JP H09217824 A 8/1997
JP 2006291997 A 10/2006
(Continued)

Primary Examiner — Edwin A Young
(74) Attorney, Agent, or Firm — Duft & Bornsen, PC

(57) ABSTRACT

An engine room temperature rise restricting apparatus including an open and close detector of the grille shutter, and a controller including a CPU and a memory coupled to the CPU, wherein the CPU and the memory are configured to perform: detecting a stuck-closed failure of a grille shutter of a condition that the grille shutter remains closed regardless of an open instruction for the grille shutter, based on signal from the open and close detector; and controlling a speed ratio of a continuously variable transmission so that an upper limit of an engine rotational speed or an engine driving force when the stuck-closed failure is detected is smaller than an upper limit of the engine rotational speed or the engine driving force when the stuck-closed failure is not detected.

11 Claims, 5 Drawing Sheets

(51) Int. Cl.
  *B60K 11/04* (2006.01)
  *B60W 10/00* (2006.01)
  *B60W 10/04* (2006.01)
  *B60W 10/06* (2006.01)
  *B60W 10/101* (2012.01)
  *B60W 10/107* (2012.01)
  *B60W 10/30* (2006.01)
  *F02D 41/22* (2006.01)
  *B60K 11/02* (2006.01)
  *F16H 63/50* (2006.01)

(52) U.S. Cl.
  CPC ....... *B60Y 2306/13* (2013.01); *B60Y 2400/72* (2013.01); *F16H 2063/504* (2013.01); *Y02T 10/88* (2013.01)

(56) References Cited

U.S. PATENT DOCUMENTS

| | | |
|---|---|---|
| 2011/0029209 A1 | 2/2011 | Hattori et al. |
| 2014/0297081 A1* | 10/2014 | Asami ............... B60L 3/0061 701/22 |
| 2014/0370795 A1* | 12/2014 | Klop .................. B60H 1/242 454/75 |

FOREIGN PATENT DOCUMENTS

| | | |
|---|---|---|
| JP | 2009257415 A | 11/2009 |
| JP | 2014218942 A | 11/2014 |
| JP | 2015227134 A | 12/2015 |
| WO | 2015037503 A1 | 3/2015 |

* cited by examiner

ENGINE ROOM TEMPERATURE RISE RESTRICTING APPARATUS

CROSS-REFERENCE TO RELATED APPLICATION

This application is based upon and claims the benefit of priority from Japanese Patent Application No. 2016-238933 filed on Dec. 9, 2016, the content of which is incorporated herein by reference.

BACKGROUND OF THE INVENTION

Field of the Invention

This invention relates to an engine room temperature rise restricting apparatus which restricts temperature rise in an engine room during a stuck-closed failure of a grille shutter.

Description of the Related Art

As a conventional technology related to this type of apparatus is known one for restricting temperature rise of exhaust purification catalyst during grille shutter stuck-closed failure. For example, the apparatus taught by Japanese Unexamined Patent Publication No. 2014-218942 (JP2014-218942A) responds to detection of grille shutter stuck-closed failure by implementing control to increase fuel injection quantity, thereby suppressing excessive increase of catalyst temperature.

However, implementing control for increasing fuel injection as a countermeasure at the time of grille shutter stuck-closed failure, as in JP2014-218942A, does not enable effective restriction of engine room temperature rise.

SUMMARY OF THE INVENTION

An aspect of the present invention is an engine room temperature rise restricting apparatus for restricting a temperature rise in an engine room of a vehicle, the vehicle including an engine, a continuously variable transmission configured to continuously change and output a rotating speed of an output shaft of the engine, and a grille shutter configured to open or close in accordance with an open or close instruction to allow or prohibit a flow of an outside air into the engine room in which the engine and the continuously variable transmission are installed, the engine room temperature rise restricting apparatus, including: an open and close detector configured to detect an open and close of the grille shutter; and a controller including a CPU and a memory coupled to the CPU, wherein the CPU and the memory are configured to perform: detecting a stuck-closed failure of the grille shutter of a condition that the grille shutter remains closed regardless of the open instruction for the grille shutter, based on a signal from the open and close detector; and controlling a speed ratio of the continuously variable transmission so that an upper limit of an engine rotational speed or an engine driving force when the stuck-closed failure is detected is smaller than an upper limit of the engine rotational speed or the engine driving force when the stuck-closed failure is not detected.

Another aspect of the present invention is an engine room temperature rise restricting apparatus for restricting a temperature rise in an engine room of a vehicle, the vehicle including an engine, a continuously variable transmission configured to continuously change and output a rotating speed of an output shaft of the engine, and a grille shutter configured to open or close in accordance with an open or close instruction to allow or prohibit a flow of an outside air into the engine room in which the engine and the continuously variable transmission are installed, the engine room temperature rise restricting apparatus, including: an open and close detector configured to detect an open and close of the grille shutter; a stuck-closed failure detector configured to detect a stuck-closed failure of the grille shutter of a condition that the grille shutter remains closed regardless of the open instruction for the grille shutter, based on a signal from the open and close detector; and a speed ratio controller configured to control a speed ratio of the continuously variable transmission so that an upper limit of an engine rotational speed or an engine driving force when the stuck-closed failure is detected by the stuck-closed failure detector is smaller than an upper limit of the engine rotational speed or the engine driving force when the stuck-closed failure is not detected.

Further aspect of the present invention is an engine room temperature rise restricting method for restricting a temperature rise in an engine room of a vehicle, the vehicle including an engine, a continuously variable transmission configured to continuously change and output a rotating speed of an output shaft of the engine, and a grille shutter configured to open or close in accordance with an open or close instruction to allow or prohibit a flow of an outside air into the engine room in which the engine and the continuously variable transmission are installed, the engine room temperature rise restricting method, including: determining whether a stuck-closed failure of the grille shutter of a condition that the grille shutter remains closed regardless of the open instruction for the grille shutter is detected; and controlling a speed ratio of the continuously variable transmission so that an upper limit of an engine rotational speed or an engine driving force when it is determined that the stuck-closed failure is detected is smaller than an upper limit of the engine rotational speed or the engine driving force when it is determined that the stuck-closed failure is not detected.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an engine room temperature rise restricting apparatus according to an embodiment of the present invention is explained with reference to FIGS. 1 to 5. The engine room temperature rise restricting apparatus is an apparatus which restricts temperature rise in an engine room of a vehicle during a stuck-closed failure of a grille shutter.

Figure 1:
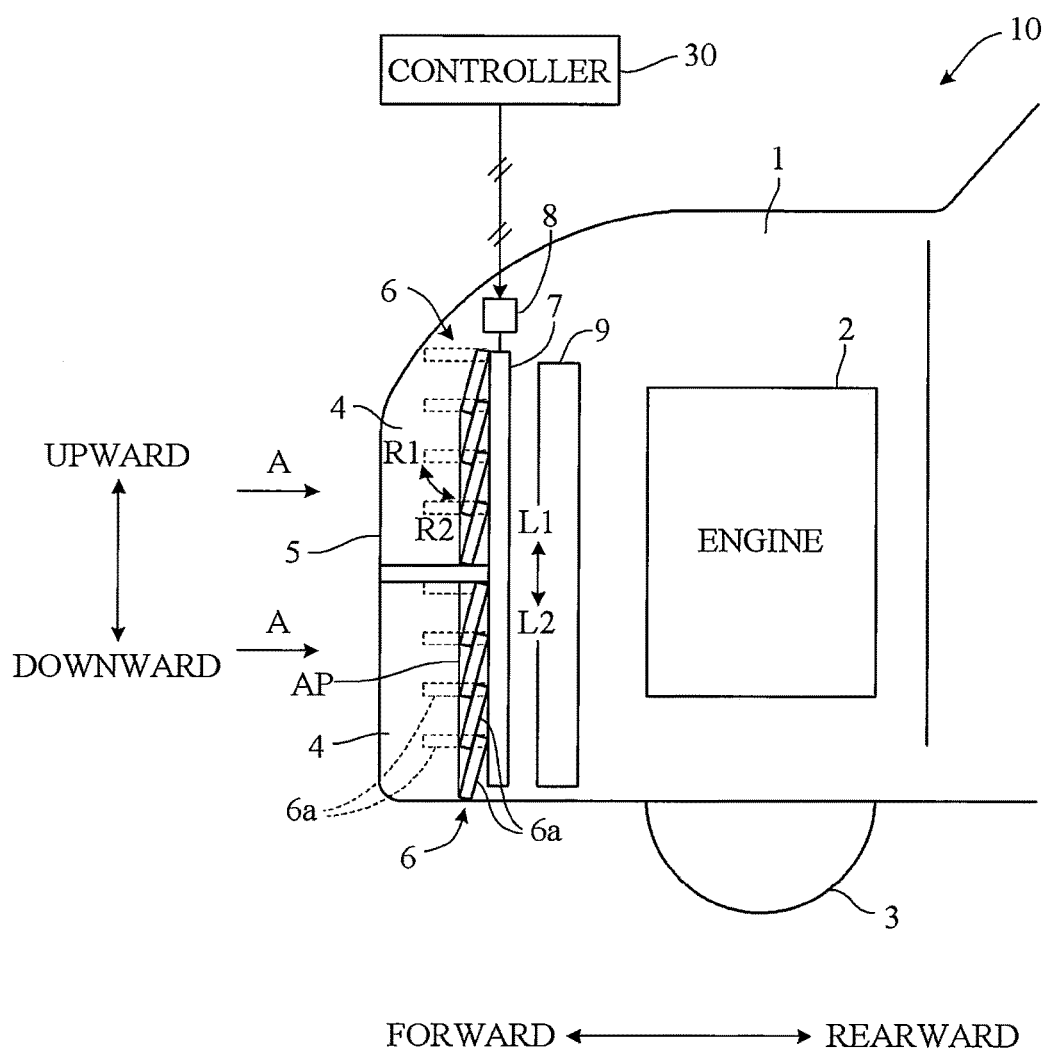
FIG. 1 is a diagram showing essential components in the front part of a vehicle to which an engine room temperature restricting apparatus according to an embodiment of the present invention is applied.

FIG. 1 is diagram showing essential components in the front part of a vehicle 10 to which the engine room temperature rise restricting apparatus according to an embodiment of the present invention is applied. For the purpose of the description that follows, forward-rearward direction and upward-downward direction of the vehicle are defined as indicated in the drawing, and lateral direction thereof is defined as direction perpendicular to both forward-rearward direction and upward-downward direction. The forward-rearward direction, upward-downward direction and lateral direction are respectively longitudinal direction, height direction and width direction of the vehicle 10.

As shown in FIG. 1, an engine 2 and a transmission (not shown; explained later) are installed in an engine room 1 in the front part of the vehicle 10, and torque output from the transmission is transmitted to drive wheels 3. A front grille 5 is installed at the frontmost part of the vehicle 10 to guide running wind (flow of external air during vehicle driving, indicated by arrow A) through ducts 4 into the engine room 1. The ducts 4 are located above and below each other, and at the rear end of each duct 4 a grill shutter 6 is installed across an air path AP inside the duct 4.

The grille shutter 6 has multiple laterally long fins 6a extending crossways and arrayed vertically. The fins 6a can rotate upward and downward around laterally extending rotating shafts (arrow R1 and R2 directions), whereby the fins 6a open and close the air path AP from the ducts 4 to the engine room 1. Namely, when the fins 6a rotate downward so that parts of the fins 6a above and below overlap (solid lines), the air path AP is closed and introduction of running wind A into the engine room 1 is blocked. When, to the contrary, the fins 6a rotate upward into horizontal posture (dotted lines), the air path AP is opened and running wind A is allowed into the engine room 1.

The fins 6a are connected to a link 7 located rearward thereof. The link 7 is installed to be movable vertically (arrow L1 and L2 directions) driven by an electric motor or other shutter actuator 8, whereby the fins 6a are simultaneously opened and closed by means of the link 7 together with upward-downward movement of the link 7. A radiator, condenser or other heat exchanger 9 is installed behind the link 7, and heat is exchanged between running wind (cooling air) and engine cooling water or coolant in the heat exchanger 9. Cooling air passed through the heat exchanger 9 passes through the engine room 1 to be discharged to the exterior.

In the so-configured vehicle 10, a controller 30 controls the shutter actuator 8 to open/close the grille shutter 6 based on driving state of the vehicle and/or temperature state of the engine room 1. So long as the grille shutter 6 operates normally, it opens in response to an open command from the controller 30, thereby allowing external air to blow into the engine room 1 and restrict temperature rise of the engine room 1.

On the other hand, in a case where the operation for opening the grille shutter 6 fails owing to jamming or sticking of foreign matter in the drive portions of the fins 6a or the link 7, malfunctioning of the fins 6a, link 7 or shutter actuator 8, breaking of a signal line for driving the shutter actuator 8, or some other cause, the grille shutter 6 stays closed irrespective of an open command from the controller 30. When this kind of stuck-closed failure of the grille shutter 6 occurs, introduction of external air into the engine room 1 is blocked and temperature of the engine room 1 rises. As a result, components installed in the engine room 1 are in danger of rising above their heat-resistant temperatures. Since this makes it necessary to use components with high heat-resistant temperatures, cost increases.

Therefore, in accordance with the present embodiment, an engine room temperature rise restricting apparatus is configured as set out below in order to restrict temperature rise of the engine room 1 during stuck-closed failure of the grille shutter 6.

Figure 2:
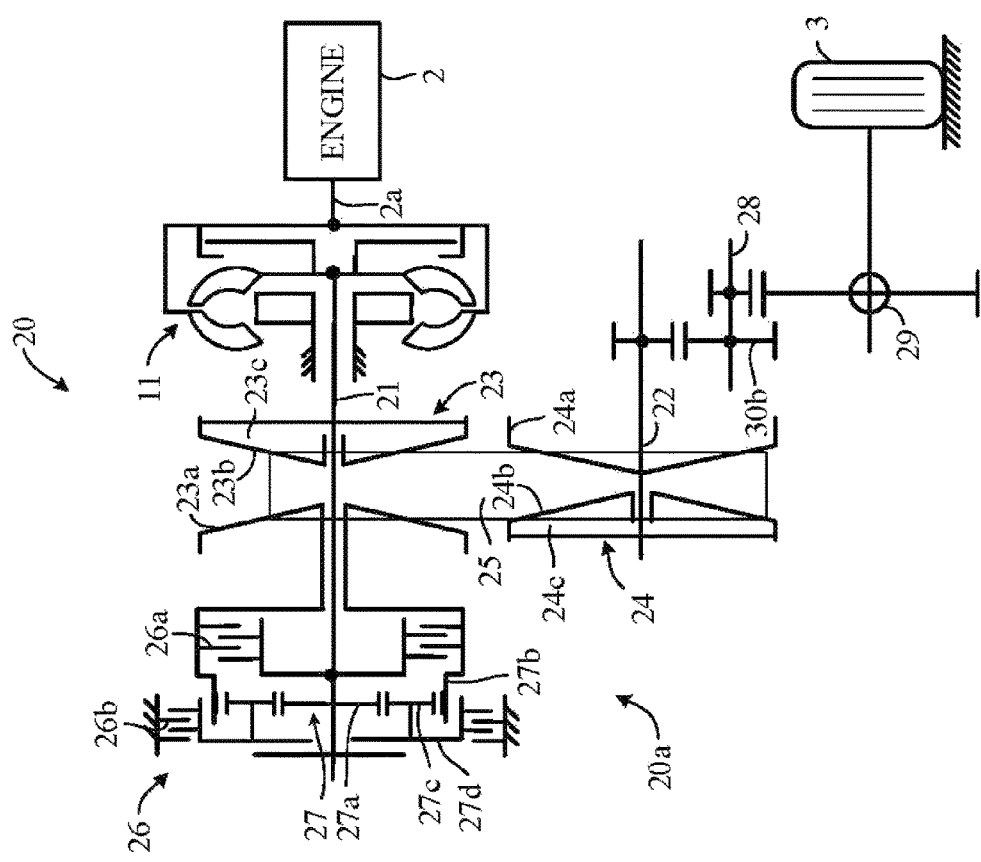
FIG. 2 is an overview of the structure of the drive system of the vehicle to which the engine room temperature restricting apparatus according to the embodiment of the present invention is applied.

The drive system structure of the vehicle 10 according to this embodiment will be explained first. FIG. 2 is an overview of the structure of the drive system of the vehicle 10. As shown in FIG. 2, rotation of a crankshaft of the engine 2 is output through an output shaft 2a and a torque converter 11 and input to an automatic transmission 20. The engine 2 is a gasoline engine that explosively combusts an injected gaseous mixture of air and fuel (gasoline). Alternatively, a diesel engine can be used as the engine 2.

The automatic transmission 20 has a main shaft 21 and a countershaft 22 parallel to the main shaft 21. The automatic transmission 20 is configured as a continuously variable transmission having a continuously variable transmission mechanism 20a. Namely, it comprises a drive pulley 23 mounted on a peripheral side shaft of the main shaft 21, a driven pulley 24 mounted on a peripheral side shaft of the countershaft 22, and a power transmission member, e.g., a metal belt 25, wound around the drive pulley 23 and driven pulley 24.

The drive pulley 23 comprises a fixed pulley half 23a fitted on the peripheral side shaft of the main shaft 21 to be incapable of relative rotation and of axial direction movement, and a movable pulley half 23b incapable of rotation relative to the peripheral side shaft of the main shaft 21 and capable of relative movement in the axial direction with respect to the fixed pulley half 23a. The movable pulley half 23b is pushed to move in axial direction in response to hydraulic force acting on a hydraulic oil chamber 23c. The driven pulley 24 comprises a fixed pulley half 24a fitted on a peripheral side shaft of the countershaft 22 to be incapable of relative rotation and of axial direction movement, and a movable pulley half 24b incapable of rotation relative to the countershaft 22 and capable of relative movement in the axial direction with respect to the fixed pulley half 24a. The movable pulley half 24b is pushed to move in axial direction in response to hydraulic force acting on a hydraulic oil chamber 24c. Hydraulic pressure regulated by control valves (FIG. 3) is supplied to the hydraulic oil chambers 23c and 24c.

The continuously variable transmission mechanism 20a is connected to the engine output shaft 2a through a forward-reverse switching mechanism 26 and the torque converter 11. The forward-reverse switching mechanism 26 comprises a forward clutch 26a that enables the vehicle 10 to drive forward and a reverse brake-clutch 26b that enables reverse driving. A range selector (not shown) provided near the vehicle operator's seat is operated to switch between the forward clutch 26a and the reverse brake-clutch 26b.

A planetary gear mechanism 27 is located between the forward clutch 26a and the reverse brake-clutch 26b. The planetary gear mechanism 27 comprises a sun gear 27a fixed on the main shaft 21, a ring gear 27b fixed on the fixed pulley half 23a of the drive pulley 23 through the forward clutch 26a, and a pinion 27c installed between the sun gear 27a and the ring gear 27b and supported to be rotatable by a carrier 27d. Rotation of the countershaft 22 is transmitted through gears to a secondary shaft 28 and further transmitted through a gear to the left and right drive wheels (only one wheel shown) 3 from a differential 29.

Figure 3:
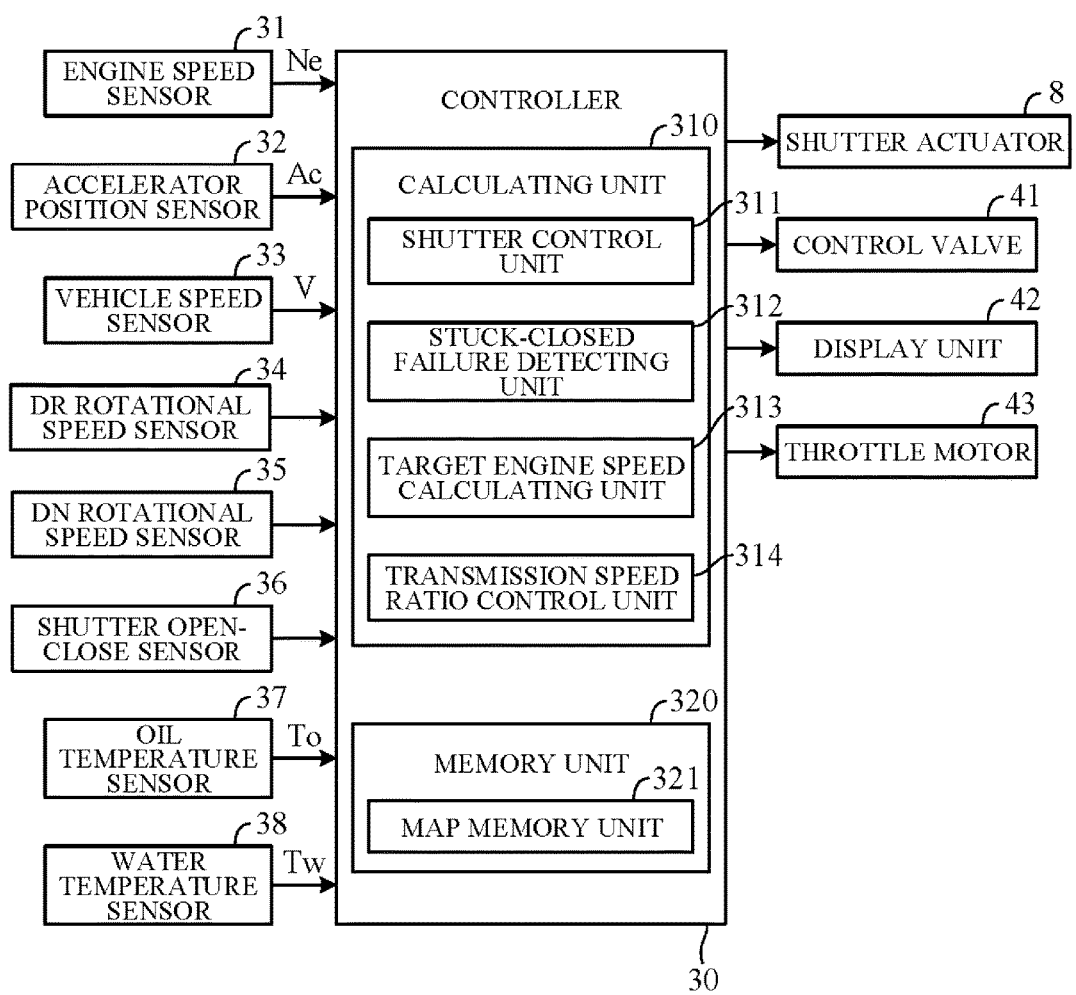
FIG. 3 is a block diagram showing a configuration overview of the engine room temperature rise restricting apparatus according to the embodiment of the present invention.

FIG. 3 is a block diagram showing a configuration overview of an engine room temperature rise restricting apparatus 100 according to the embodiment of the present invention. A controller 30 shown in FIG. 3 includes an engine control unit and a transmission control unit, but instead a separate controller 30 can be provided for each control unit.

As shown in FIG. 3, the controller 30 receives signals from an engine speed sensor 31 that detects engine speed Ne, an accelerator position sensor 32 that detects depression of an accelerator pedal by the operator (accelerator opening angle Ac), a vehicle speed sensor 33 that detects vehicle running speed (vehicle speed V), a DR rotational speed sensor 34 that detects rotational speed of the drive pulley 23, a DN rotational speed sensor 35 that detects rotational speed of the driven pulley 24, a shutter open-close sensor 36 that detects open-close state of the grille shutter 6, an oil temperature sensor 37 that detects temperature of hydraulic oil, lubricating oil and other oils supplied to the automatic transmission 20 (oil temperature To), and a water temperature sensor 38 for detecting temperature of engine cooling water (cooling water temperature Tw). Although not shown in FIG. 3, the controller 30 also receives a signal from an intake air temperature sensor or the like that detects intake air temperature.

By performing predetermined processing based on the received signals, the controller 30 generates and outputs control signals to the shutter actuator 8 for driving the grille shutter (FIG. 1), multiple control valves 41 (only one shown in the drawings) for controlling hydraulic pressures supplied to the hydraulic oil chambers 23c and 24c facing the movable pulley halves 23b and 24b (FIG. 2), a display unit (e.g., a meter panel) 42 installed in front of the operator's seat, and a throttle motor 43 for regulating throttle opening angle. Although not shown in FIG. 3, the controller 30 also outputs control signals to fuel injection valves, sparkplugs and so on.

The controller 30 comprises a CPU or other calculating unit 310, a memory unit 320 including RAM, ROM and the like, and associated peripheral circuits. As functional constituents, the calculating unit 310 has a shutter control unit 311, a stuck-closed failure detecting unit 312, a target engine speed calculating unit 313, and a transmission speed ratio control unit 314. The memory unit 320 has a map memory unit 321 as a functional constituent.

Figure 4:
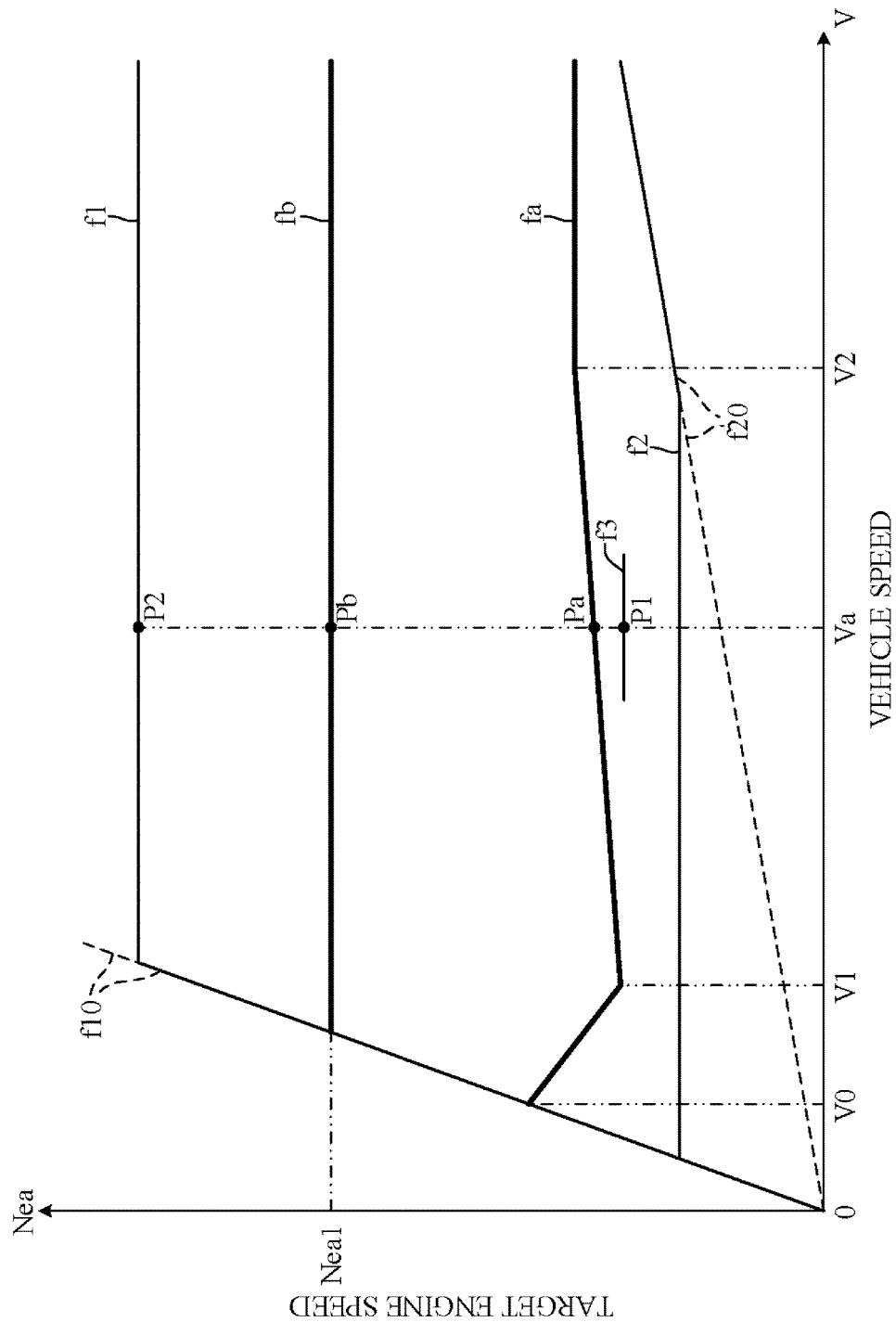
FIG. 4 is a diagram showing an example of a speed ratio map stored in a map memory unit of FIG. 3.

The map memory unit 321 is loaded in advance with a speed ratio map representing characteristics applied to the continuously variable transmission 20. FIG. 4 is a diagram showing an example of a speed ratio map stored in the map memory unit 321. The speed ratio map shows relation between vehicle speed V and target engine speed Nea as a function of accelerator opening angle Ac. Characteristic curve f1 in the drawing shows relation between vehicle speed V and target engine speed Nea when accelerator opening angle Ac is wide open, i.e., when accelerator depression is maximum (100%). Characteristic curve f2 shows relation between vehicle speed V and target engine speed Nea when accelerator opening angle Ac is full closed, i.e., when accelerator depression is minimum (0%).

Although none are shown, a number of characteristic curves representing vehicle speed V and target engine speed Nea as a function of different accelerator opening angles Ac are established between the characteristic curve f1 and the characteristic curve f2, namely, a number of characteristic curves are established that approach curve f1 with increasing accelerator opening angle Ac and approach curve f2 with decreasing accelerator opening angle Ac, and these characteristic curves are also stored in the map memory unit 321. Characteristic curves f10 and f20 relate to minimum speed ratio and maximum speed ratio, respectively, and speed ratio can be switched between the f10 and f20 characteristics. An aspect to be noted here is that at any given vehicle speed V, target engine speed Nea increases with increasing accelerator opening angle Ac.

In the present embodiment, a characteristic curve fa representing upper limit value of the target engine speed Nea during grille shutter stuck-closed failure and a characteristic curve fb representing upper limit value of the target engine speed Nea when oil temperature To reaches or exceeds a predetermined value Toa are stored in advance as speed ratio characteristics in the map memory unit 321 in addition to the aforesaid characteristic curves of specific accelerator opening angles Ac (f1, f2, etc.).

Characteristic curve fa is defined so that in a low-speed range of vehicle speed V not higher than a predetermined value V1 (e.g., 40 km/h) target engine speed Nea gradually decreases with increasing vehicle speed V, that in a mid-to-high-speed range of vehicle speed V higher than predetermined value V1 and not higher than a predetermined value V2 (e.g., 120 km/h) target engine speed Nea gradually increases with increasing vehicle speed V, and that in an ensuing range of engine speed higher than predetermined value V2 target engine speed Nea stays constant or gently rises with increasing vehicle speed V.

Since upper limit value of target engine speed Nea is thus set at high value in low-speed range (e.g., vehicle speed V0), adequate propulsion torque for driving the vehicle 10 can be obtained. Moreover, speed of the vehicle 10 can be smoothly accelerated while restricting temperature rise of the engine room 1 because target engine speed upper limit value is once lowered (at vehicle speed V1) and target engine speed Nea is thereafter gradually increased from mid-speed to high-speed range.

As shown in FIG. 4, characteristic curve fb is defined as an upper limit value Nea1 that stays constant irrespective of vehicle speed V. More specifically, upper limit value Nea1 is defined as a value greater than upper limit value of target engine speed Nea during grille shutter stuck-closed failure (characteristic curve fa). The reason for this is that, differently from grille shutter stuck-closed failure, a problem of high oil temperature To can be expected to mitigate over time, so that restriction of target engine speed need not be as severe as during grille shutter stuck-closed failure. Since upper limit value Nea1 of target engine speed Nea when oil temperature To is equal to or greater than predetermined value Toa is thus defined as a higher value than upper limit value of target engine speed Nea during grille shutter stuck-closed failure (characteristic curve fa), good driving performance can be ensured while restricting rise of oil temperatures To.

Based on signals from, inter alia, the water temperature sensor 38, the shutter control unit 311 of FIG. 3 outputs a control signal to the shutter actuator 8 to control open-close of the grille shutter 6. Specifically, when cooling water temperature Tw detected by the water temperature sensor 38 rises to or above a predetermined temperature Twa, an open command is output to the shutter actuator 8 to open the grille shutter 6 from closed condition.

The stuck-closed failure detecting unit 312 detects stuck-closed failure of the grille shutter 6 based on a signal from the shutter open-close sensor 36. Namely, when open state of the grille shutter 6 is not detected by the shutter open-close sensor 36 notwithstanding that the controller 30 outputted an open command to the shutter actuator 8, the stuck-closed failure detecting unit 312 determines that grille shutter 6 is stuck-closed failureing.

The target engine speed calculating unit 313 uses signals from the accelerator position sensor 32, vehicle speed sensor 33 and oil temperature sensors 37 to retrieve target engine speed Nea from the map of speed ratios by individual accelerator opening angle Ac shown in FIG. 4. For this, the target engine speed calculating unit 313 first accesses the speed ratio map of FIG. 4 to retrieve the target engine speed corresponding to current vehicle speed V and accelerator opening angle Ac (hereinafter called "base target engine speed Nea0). Then, when stuck-closed failure of the grille shutter 6 is not detected and oil temperature To is below predetermined value Toa, it adopts base target engine speed Nea0, as is, as target engine speed Nea.

When, to the contrary, stuck-closed failure of the grille shutter 6 is detected, the sizes of base target engine speed Nea0 and upper limit value of target engine speed defined by characteristic curve fa of FIG. 4 (hereinafter called "stuck-closed failure upper limit engine speed Nea2") are compared. When Nea0≤Nea2, it adopts base target engine speed Nea0, as is, as target engine speed Nea. When Nea0>Nea2, it adopts stuck-closed failure upper limit engine speed Nea2 as target engine speed Nea.

When stuck-closed failure of the grille shutter 6 is not detected and oil temperature To is not lower than predetermined value Toa, the sizes of base target engine speed Nea0 and upper limit value of target engine speed defined by characteristic curve fb of FIG. 4 (hereinafter called "oil temperature upper limit engine speed Nea1") are compared. When Nea0≤Nea1, it adopts base target engine speed Nea0, as is, as target engine speed Nea. When Nea0>Nea1, it adopts oil temperature upper limit value Nea1 as target engine speed Nea.

In order to bring engine speed Ne detected by the engine speed sensor 31 to target engine speed Nea, the transmission speed ratio control unit 314 controls speed ratio of the automatic transmission 20 by outputting to the associated control valve 41 a control signal proportional to deviation between engine speed Ne and target engine speed Nea. For example, when target engine speed Nea is high owing to increased accelerator opening angle Ac, speed ratio is controlled to low side so as to bring engine speed Ne closer to target engine speed Nea. Actual speed ratio can be calculated based on signals from the DR rotational speed sensor 34 and DN rotational speed sensor 35.

Figure 5:
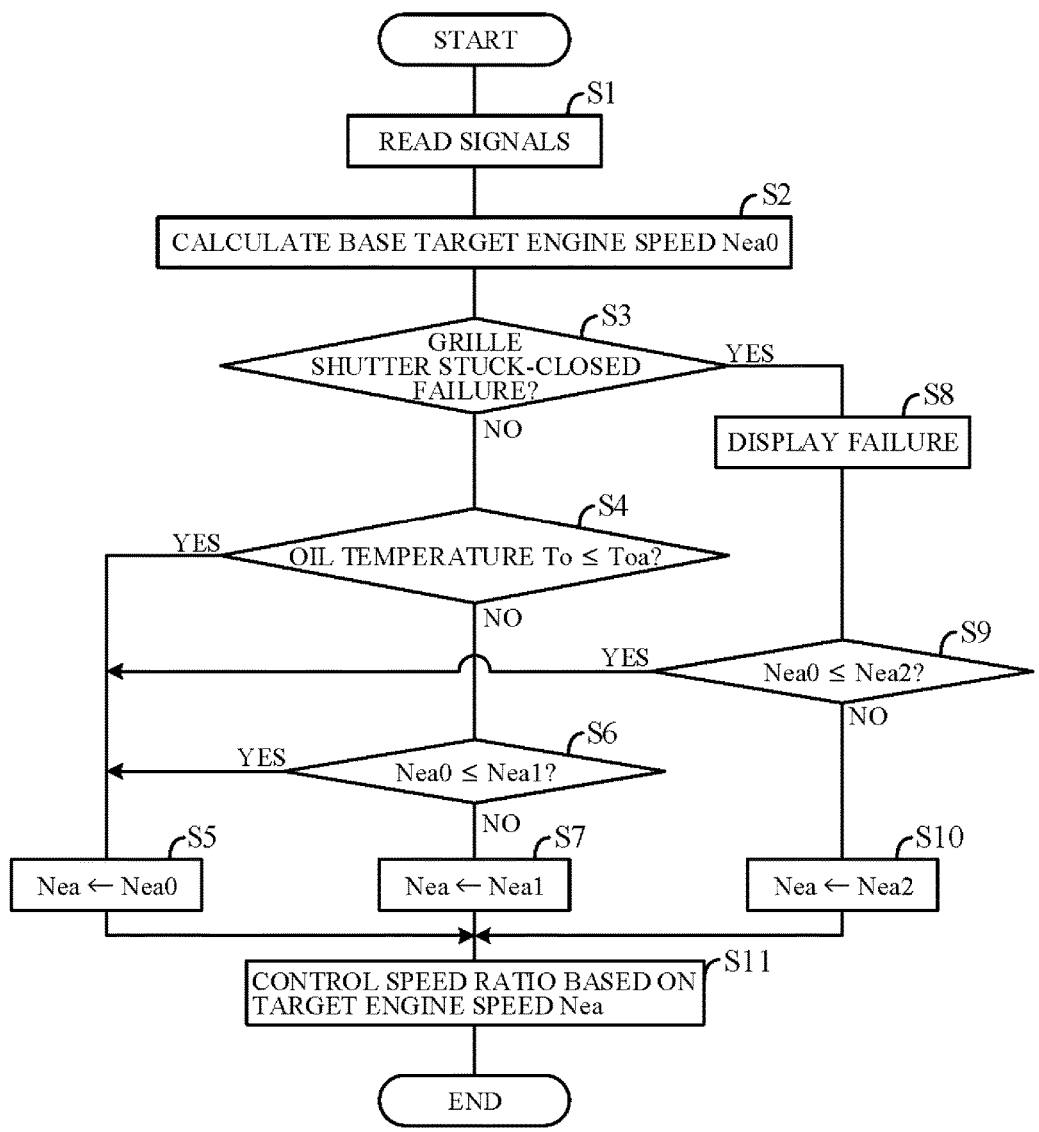
FIG. 5 is a flowchart showing an example of processing performed by a controller of FIG. 4.

FIG. 5 is a flowchart showing an example of processing performed by the controller 30 (calculating unit 310) in accordance with a program established beforehand. The processing shown in this flowchart is, for example, launched upon turn-on of an engine key switch and repeated at predetermined intervals.

First, in S1 (S: processing Step), signals are read from the sensors indicated in FIG. 3. Next, in S2, base target engine speed Nea0 corresponding to detected vehicle speed V and accelerator opening angle Ac is calculated in accordance with the predefined characteristics of FIG. 4. In S3, whether stuck-closed failure of the grille shutter 6 was detected is determined by processing in the stuck-closed failure detecting unit 312. When the result in S3 is NO, the program goes to S4 to determine whether detected oil temperature To is at or below predetermined value Toa. When the result in S4 is YES, the program goes to S5, in which base target engine speed Nea0 is set as target engine speed Nea. In other words, when shutter stuck-closed failure is not detected and oil temperature To is at or below predetermined value Toa, target engine speed Nea need not be limited, so base target engine speed Nea0 is adopted, as is, as target engine speed Nea.

On the other hand, when the result in S4 is NO, the program goes to S6 to determine whether base target engine speed Nea0 is equal to or lower than oil temperature upper limit engine speed Nea1. When the result in S6 is YES, the program goes to S5, and when NO, to S7. In S7, oil temperature upper limit engine speed Nea1 is set as target engine speed Nea. Namely, in this case, rise of oil temperature To is suppressed by setting target engine speed Nea to the lower of base target engine speed Nea0 and oil temperature upper limit engine speed Nea1.

When the result in S3 is YES, the program goes to S8 to output a control signal to the display unit 42 for displaying that the grille shutter 6 is malfunctioning. In other words, the vehicle operator is informed that grille shutter stuck-closed failure occurred. This alerts the operator to limited engine speed and propulsion torque during driving. Next, in S9, whether base target engine speed Nea0 is at or below failure upper limit engine speed Nea2 is determined. When the result in S9 is YES, the program goes to S5, and when NO, to S10. In S10, failure upper limit engine speed Nea2 is set as target engine speed Nea. Namely, in this case, rise of engine room 1 temperature is suppressed by setting target engine speed Nea to the lower of base target engine speed Nea0 and failure upper limit engine speed Nea2.

When target engine speed Nea is set in any of S5, S7 and S10, the program goes to S11, in which speed ratio of the automatic transmission 20 is controlled in accordance with the set target engine speed Nea. Namely, control signals are output to associated control valves 41 to drive the movable pulley halves 23b and 24b so as to bring engine speed Ne closer to target engine speed Nea.

There now follows a concrete explanation of specific operations of the engine room temperature rise restricting apparatus according to the present embodiment. Characteristic curve f3 shown as a feature of FIG. 4 represents characteristics when accelerator opening angle Ac is a certain value between wide open and full closed. In a state of driving at vehicle speed Va (point P1) under this accelerator opening angle Ac, let us assume that accelerator opening angle Ac is wide open. Vehicle speed V does not immediately rise in this situation, so that insofar as the grille shutter 6 is operating normally and oil temperature To is at or below predetermined value Toa, target engine speed Nea rises to, for example, engine speed at point P2 on characteristic curve f1 (S5), and speed ratio is controlled to low side so that engine speed Ne becomes target engine speed (S11).

On the other hand, when oil temperature To is at or higher than predetermined value Toa during normal operating condition of the grille shutter 6, upper limit value of target engine speed Nea is constrained to oil temperature upper limit engine speed Nea1 on characteristic curve fb (point Pb) (S7). Since this inhibits rise of engine speed Ne, it suppresses increase of oil temperature To. To the contrary, when stuck-closed failure of the grille shutter 6 is detected, target engine speed Nea is limited to speed at point Pa on characteristic curve fa (S10). Since this more thoroughly inhibits rise of engine speed Ne, it restricts temperature rise of the engine room 1 by suppressing heat generation of the engine 2 and automatic transmission 20.

The present embodiment of the invention can achieve advantages and effects such as the following:

(1) The engine room temperature rise restricting apparatus 100 is for restricting temperature rise in the engine room 1 of the vehicle 10, the vehicle 10 including the engine 2, the continuously variable transmission 20 configured to continuously change and output rotating speed of the output shaft 2a of the engine 2, and the grille shutter 6 configured to open or close in accordance with open or close instruction to allow or prohibit flow of the outside air into the engine room 1 in which the engine 2 and the continuously variable transmission 20 are installed. The engine room temperature rise restricting apparatus 100 includes: the shutter open-close sensor 36 configured to detect an open and close of the grille shutter 6; the stuck-closed failure detecting unit 312 configured to detect stuck-closed failure of the grille shutter 6 of a condition that the grille shutter 6 remains closed regardless of the open instruction for the grille shutter 6, based on signal from the shutter open-close sensor 36; and the transmission speed ratio control unit 314 configured to control the speed ratio of the continuously variable transmission 20 so that an upper limit of an engine rotational speed or an engine driving force when the stuck-closed failure is detected by the stuck-closed failure detecting unit 312 is smaller than an upper limit of the engine rotational speed or the engine driving force when the stuck-closed failure is not detected (FIG. 3).

Since this configuration limits engine speed Ne during grille shutter stuck-closed failure, it can restrict temperature rise of the engine room 1. Temperature of components installed in the engine room 1 can therefore be easily held to no higher than their heat-resistant temperatures without using costly high-temperature resistant components. Moreover, the fact that the continuously variable transmission 20 is capable of continuously variable speed ratio regulation makes it possible to apply speed ratio control to easily constrain engine speed Ne to a predetermined speed (target engine speed Nea).

(2) The engine room temperature rise restricting apparatus 100 further includes: the vehicle speed sensor 33 configured to detect driving speed of the vehicle 10 (vehicle speed) V; the accelerator position sensor 32 configured to detect accelerator opening angle Ac; the map memory unit 321 configured to store the speed ratio map (FIG. 4) representing relation between vehicle speed V, accelerator opening angle Ac and target engine speed Nea; and the target engine speed calculating unit 313 configured to calculate the target engine speed Nea in accordance with the speed ratio map stored in the map memory unit 321, based on the vehicle speed V detected by the vehicle speed sensor 33 and the accelerator opening angle Ac detected by the accelerator position sensor 32 (FIG. 3).

the map memory unit 321 is further configured to store the speed ratio map (characteristic curve fa) defined so that the upper limit value of the target engine speed Nea when the stuck-closed failure is detected by the stuck-closed failure detecting unit 312 is smaller than the upper limit of the target engine speed Nea when the stuck-closed failure is not detected (FIG. 4), and the transmission speed ratio control unit 314 is further configured to control the speed ratio of the continuously variable transmission 20 so that the engine speed Ne becomes the target engine speed Nea calculated by the target engine speed calculating unit 313 (S11).

Owing to use of the speed ratio map in this manner, it becomes possible during grille shutter stuck-closed failure to easily set upper limit value of target engine speed Nea in accordance with vehicle speed V and accelerator opening angle Ac. Moreover, engine speed Ne can be easily controlled to target engine speed Nea by controlling speed ratio of the continuously variable transmission 20 in accordance with target engine speed Nea.

(3) The engine room temperature rise restricting apparatus 100 further includes: the oil temperature sensor 37 configured to detect the oil temperature To supplied to the continuously variable transmission 20 (FIG. 3). The transmission speed ratio control unit 314 is further configured to control the speed ratio of the continuously variable transmission 20 so that an upper limit of the engine rotational speed Ne (Nea1>Nea2) when the oil temperature To detected by the oil temperature sensor 37 exceeds a predetermined temperature Toa is greater than the upper limit of the engine rotational speed Ne when the stuck-closed failure is detected by the stuck-closed failure detecting unit 312. More specifically, the map memory unit 321 is configured to store a first shift map (characteristic curve fa) defining the upper limit of the target engine rotational speed when the stuck-closed failure is detected and a second shift map (characteristic curve fb) defining the upper limit of the target engine rotational speed when the oil temperature detected by the oil temperature sensor 37 exceeds the predetermined temperature Toa, and the upper limit Nea1 defined by the characteristic curve fb is greater than the upper limit Nea2 defined by the characteristic curve fa.

This configuration can inhibit rise of oil temperature To because engine speed Ne is limited when oil temperature To reaches or exceeds predetermined value Toa. And upper limit value Nea1 of engine speed during oil temperature rise is higher than upper limit value Nea2 of engine speed during grille shutter stuck-closed failure, so that good running performance can be exhibited while suppressing rise of oil temperature To.

Various modifications of the aforesaid embodiment are possible. Some examples are explained in the following. In the aforesaid embodiment, the stuck-closed failure detecting unit 312 detects grille shutter stuck-closed failure, i.e., that the grille shutter 6 remains closed irrespective of an open command, based on a signal from the shutter open-close sensor 36 serving as an open-close detector, but the stuck-closed failure detecting unit is not limited to this configuration. The grille shutter 6 can be structured to be adjustable not only between two positions, i.e. full closed and wide open, but also among arbitrary intermediate positions between full closed and wide open. The stuck-closed failure detecting unit can be configured to detect grille shutter stuck-closed failure not only in absolutely full-closed condition but also in nearly full-closed condition. In the aforesaid embodiment, the grille shutter 6 is split into halves located above and below each other, but the grille shutter is not limited to this configuration or layout.

In the aforesaid embodiment, the transmission speed ratio control unit 314 controls the speed ratio of the continuously variable transmission 20 so as to bring engine speed into coincidence with target engine speed calculated by the target engine speed calculating unit 313, but the speed ratio control unit is not limited to this configuration insofar as it responds to grille shutter stuck-closed failure being detected by controlling speed ratio of the continuously variable transmission mechanism by restricting upper limit value of engine speed more than when it is not detected. Alternatively, upper limit value of engine driving force can be restricted instead of upper limit value of engine speed.

In the aforesaid embodiment, the target engine speed calculating unit 313 uses vehicle speed V detected by the vehicle speed sensor 33 serving as a running speed detector and accelerator opening angle Ac detected by the accelerator position sensor 32 serving as an accelerator opening angle detector as address data to retrieve target engine speed Nea from the speed ratio map stored in the map memory unit 321, but the target engine speed calculating unit is not limited to this configuration.

In the aforesaid embodiment, the speed ratio map is stored in the map memory unit 321 of the controller 30, but the map memory unit can instead be located outside the controller 30 and the speed ratio map stored therein. The relationships expressed by the speed ratio map (e.g., by characteristic curve fa) are not limited to what is shown in FIG. 4 and can be of any nature insofar as established so that upper limit value of target engine speed during grille shutter stuck-closed failure is lower than upper limit value of target engine speed when grille shutter stuck-closed failure is not detected.

In the aforesaid embodiment, oil temperature To of oil supplied to the continuously variable transmission 20 is detected by the oil temperature sensor 37 serving as an oil temperature detector, and when detected oil temperature To exceeds predetermined value Toa, speed ratio of the continuously variable transmission 20 is controlled to make upper limit value of target engine speed Nea greater than when grille shutter stuck-closed failure is detected (Nea1>Nea2), but this is not intended to limit the relation between upper limit value of target engine speed when oil temperature is equal to or greater than a predetermined value and upper limit value of target engine speed when grille shutter stuck-closed failure is detected.

The above embodiment can be combined as desired with one or more of the above modifications.

According to the present invention, since it controls the speed ratio of the continuously variable transmission so that the upper limit of the engine speed or the engine driving force when the grille shutter stuck-closed failure is detected is smaller than the upper limit of the engine speed or the engine driving force when the grille shutter stuck-closed failure is not detected, it can restrict temperature rise of the engine room efficiently.

Above, while the present invention has been described with reference to the preferred embodiments thereof, it will be understood, by those skilled in the art, that various changes and modifications may be made thereto without departing from the scope of the appended claims.

What is claimed is:

1. An engine room temperature rise restricting apparatus for restricting a temperature rise in an engine room of a vehicle, the vehicle including an engine, a continuously variable transmission configured to continuously change and output a rotating speed of an output shaft of the engine, and a grille shutter configured to open or close in accordance with an open or close instruction to allow or prohibit a flow of an outside air into the engine room in which the engine and the continuously variable transmission are installed, the engine room temperature rise restricting apparatus, comprising:
an open and close detector configured to detect an open and close of the grille shutter; and
a controller including a CPU and a memory coupled to the CPU, wherein the CPU and the memory are configured to perform:
detecting a stuck-closed failure of the grille shutter of a condition that the grille shutter remains closed regardless of the open instruction for the grille shutter, based on a signal from the open and close detector; and
controlling a speed ratio of the continuously variable transmission so that an upper limit of an engine rotational speed or an engine driving force when the stuck-closed failure is detected is smaller than an upper limit of the engine rotational speed or the engine driving force when the stuck-closed failure is not detected.

2. The apparatus according to claim 1, further comprising:
a vehicle speed detector configured to detect a vehicle speed; and
an accelerator opening detector configured to detect an accelerator opening, wherein the CPU and the memory are configured to perform:
storing a shift map representing a relationship between the vehicle speed, the accelerator and a target engine rotational speed;
calculating the target engine rotational speed in accordance with the shift map stored, based on the vehicle speed detected by the vehicle speed detector and the accelerator opening detected by the accelerator opening detector; and
the controlling comprising controlling the speed ratio of the continuously variable transmission so that the engine rotational speed becomes the calculated target engine rotational speed.

3. The apparatus according to claim 2, wherein the CPU and the memory are configured to perform
the storing comprising storing the shift map defined so that an upper limit of the target engine rotational speed when the stuck-closed failure is detected is smaller than an upper limit of the target engine rotational speed when the stuck-closed failure is not detected.

4. The apparatus according to claim 1, further comprising an oil temperature detector configured to detect an oil temperature supplied to the continuously variable transmission, wherein the CPU and the memory are configured to perform
the controlling comprising controlling the speed ratio of the continuously variable transmission so that an upper limit of the engine rotational speed when the oil temperature detected by the oil temperature detector exceeds a predetermined value is greater than the upper limit of the engine rotational speed when the stuck-closed failure is detected.

5. An engine room temperature rise restricting apparatus for restricting a temperature rise in an engine room of a vehicle, the vehicle including an engine, a continuously variable transmission configured to continuously change and output a rotating speed of an output shaft of the engine, and a grille shutter configured to open or close in accordance with an open or close instruction to allow or prohibit a flow of an outside air into the engine room in which the engine and the continuously variable transmission are installed, the engine room temperature rise restricting apparatus, comprising:
an open and close detector configured to detect an open and close of the grille shutter;
a stuck-closed failure detector configured to detect a stuck-closed failure of the grille shutter of a condition that the grille shutter remains closed regardless of the open instruction for the grille shutter, based on a signal from the open and close detector; and
a speed ratio controller configured to control a speed ratio of the continuously variable transmission so that an upper limit of an engine rotational speed or an engine driving force when the stuck-closed failure is detected by the stuck-closed failure detector is smaller than an upper limit of the engine rotational speed or the engine driving force when the stuck-closed failure is not detected.

6. The apparatus according to claim 5, further comprising:
a vehicle speed detector configured to detect a vehicle speed;
an accelerator opening detector configured to detect an accelerator opening;
a map memory configured to store a shift map representing a relationship between the vehicle speed, the accelerator and a target engine rotational speed; and
a target engine rotational speed calculator configured to calculate the target engine rotational speed in accordance with the shift map stored in the map memory, based on the vehicle speed detected by the vehicle speed detector and the accelerator opening detected by the accelerator opening detector, wherein
the map memory is further configured to store the shift map defined so that an upper limit of the target engine rotational speed when the stuck-closed failure is detected by the stuck-closed failure detector is smaller than an upper limit of the target engine rotational speed when the stuck-closed failure is not detected, and
the speed ratio controller is further configured to control the speed ratio of the continuously variable transmission so that the engine rotational speed becomes the target engine rotational speed calculated by the target engine rotational speed calculator.

7. The apparatus according to claim 6, further comprising an oil temperature detector configured to detect an oil temperature supplied to the continuously variable transmission, wherein
the map memory is further configured to store a first shift map defining the upper limit of the target engine rotational speed when the stuck-closed failure is detected and a second shift map defining an upper limit of the target engine rotational speed when the oil temperature detected by the oil temperature detector exceeds a predetermined value, and the upper limit defined by the second shift map is greater than the upper limit defined by the first shift map.

8. The apparatus according to claim 6, wherein the shift map defining the upper limit of the target engine rotational speed stored in the map memory when the stuck-closed failure is detected is defined so that the target engine rotational speed gradually decreases along with an increase of the vehicle speed in a range of the vehicle speed slower than or equal to a predetermined speed, and the target engine rotational speed gradually increases along with the increase of the vehicle speed in a range of the vehicle speed faster than the predetermined speed.

9. The apparatus according to claim 5, further comprising an oil temperature detector configured to detect an oil temperature supplied to the continuously variable transmission, wherein
the speed ratio controller is further configured to control the speed ratio of the continuously variable transmission so that an upper limit of the engine rotational speed when the oil temperature detected by the oil temperature detector exceeds a predetermined value is greater than the upper limit of the engine rotational speed when the stuck-closed failure is detected by the stuck-closed failure detector.

10. The apparatus according to claim 5, further comprising a display configured to display the stuck-closed failure of the grille shutter detected by the stuck-closed failure detector.

11. An engine room temperature rise restricting method for restricting a temperature rise in an engine room of a vehicle, the vehicle including an engine, a continuously variable transmission configured to continuously change and output a rotating speed of an output shaft of the engine, and a grille shutter configured to open or close in accordance with an open or close instruction to allow or prohibit a flow of an outside air into the engine room in which the engine and the continuously variable transmission are installed,
the engine room temperature rise restricting method, comprising:
determining whether a stuck-closed failure of the grille shutter of a condition that the grille shutter remains closed regardless of the open instruction for the grille shutter is detected; and
controlling a speed ratio of the continuously variable transmission so that an upper limit of an engine rotational speed or an engine driving force when it is determined that the stuck-closed failure is detected is smaller than an upper limit of the engine rotational speed or the engine driving force when it is determined that the stuck-closed failure is not detected.

* * * * *